(12) United States Patent
Wen et al.

(10) Patent No.: US 8,253,979 B2
(45) Date of Patent: Aug. 28, 2012

(54) METHOD OF PROCESSING NEUTRAL GRAY COLOR PRINT JOBS AS MONOCHROME BLACK DURING BILLING DETECTION AND PRINTING AS A NEUTRAL GRAY COMPOSITE BLACK

(75) Inventors: Zhenhuan Wen, Pittsford, NY (US); Francis K. Tse, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 751 days.

(21) Appl. No.: 12/366,268

(22) Filed: Feb. 5, 2009

(65) Prior Publication Data

US 2010/0195158 A1 Aug. 5, 2010

(51) Int. Cl.
*H04N 1/405* (2006.01)

(52) U.S. Cl. .......................................... 358/2.1; 358/1.1

(58) Field of Classification Search ................. 358/1.1, 358/1.9, 2.1, 3.23, 462, 500–501, 504, 518, 358/523, 529
See application file for complete search history.

(56) References Cited

U.S. PATENT DOCUMENTS

| | | | | |
|---|---|---|---|---|
| 5,459,678 A | * | 10/1995 | Feasey | 358/518 |
| 6,259,536 B1 | * | 7/2001 | Coleman | 358/1.9 |
| 7,154,636 B2 | * | 12/2006 | Haikin et al. | 358/1.9 |
| 7,190,487 B2 | * | 3/2007 | Dalrymple et al. | 358/1.9 |
| 8,064,112 B1 | * | 11/2011 | Bernasconi | 358/515 |
| 2009/0009778 A1 | * | 1/2009 | Wen | 358/1.9 |

* cited by examiner

*Primary Examiner* — Thomas D Lee
*Assistant Examiner* — Stephen M Brinich
(74) *Attorney, Agent, or Firm* — Fay Sharpe LLP

(57) ABSTRACT

A method of converting a RIPped K-only page or pixels to composite black in a digital print engine is included which executes the conversion process during current job workflow, while detecting the K-only page or pixels for billing purposes as K-only, and printed out as composite black.

4 Claims, 1 Drawing Sheet

METHOD OF PROCESSING NEUTRAL GRAY COLOR PRINT JOBS AS MONOCHROME BLACK DURING BILLING DETECTION AND PRINTING AS A NEUTRAL GRAY COMPOSITE BLACK

CROSS REFERENCE TO RELATED PATENTS AND APPLICATIONS

U.S. application Publication No. US 2009-0009778 A1, published Jan. 8, 2009, entitled CONVERTING BLACK TO COMPOSITE BLACK IN DIGITAL PRINTING, disclosure of which is incorporated herein by reference in its entirety.

TECHNICAL FIELD

The presently disclosed embodiments are directed to a digital color printing system.

BACKGROUND

In today's business and scientific world, color has become essential as a component of communication. Color facilitates the sharing of knowledge and ideas. Companies involved in the development of digital color print engines are continuously looking for ways to improve the total image quality of their products. One of the elements that affects image quality is the ability to consistently produce the same quality image output on an imaging device or printer from one day to another, from one week to the next, month after month. There has been a long felt commercial need for efficiently maintaining print color image quality and predictability, particularly as electronic marketing has placed more importance on the accurate representation of merchandise in illustrative print or display media.

Digital color printers are capable of high image quality printing with CMYK toner/ink (C=cyan, M=magenta, Y=yellow and K=black), and regularly detect the processing of the pages as either color (CMYK) or a monochrome (black only), then charge the printed pages at a cost of either a color or a monochrome price accordingly Customers expect high image quality printing with low cost charging per page, particular or a neutral gray color job. Besides page level color or monochrome detection, a latest marketing push is to have a tiered color billing approach where customers are charged for the amount of color that is present on a page. For example, a customer will expect that a page with all or mostly neutral gray colors (with equal RGB value, R=red, G=green, B=blue) should be charged as monochrome instead of color because it is what they see on the display systems. At the same time, they expect high quality printing. However, certain digital color print engines, such as ink jet and solid ink jet print engines, do not provide an image quality of black ink/toner only printing as good as that of a composite black printing (printed with combinations of CMYK toner/ink). As a practical matter, the color printers either RIP (raster image process) and print neutral gray color job in black only and charge at monochrome price, or RIP and print in composite black and charge at the color price.

Where the overall print job will only involve a page of monochrome black only (K-only) or pages with mostly monochrome black and with very little color content, customers have an expectation that when the page of a print job is totally or mostly monochrome, K only, the cost of that page should be less than the cost of printing a page comprised of a lot of colors, CMYK. As a practical matter, most suppliers of color printers will regularly detect the processing of a color printed job as either a composite color (CMYK) or a monochrome black (K only), and will charge a customer less for printing a page of K-only. In addition, for an input job having all or mostly neutral gray color (R=G=B), customers may view the page as a monochrome gray job, even though it is actually printed a composite gray (C,M,Y,K) and will expect the lower billing rate for that page.

To meet the customer's expectation for color billing, RIP processing workflow in the printer can set the job as "print as K-only" as a default for pixels that are "True Gray" (K-only) or "RGB Neutral Gray" (composite black with equal RGB values), instead of actually printing a composite black for the input color. For this "print as K-only" mode, image quality degradation of tone and color hue match will occur. More particularly, when a job will contain a sweep of K-only or neutral gray color (R=G=B) to near neutral gray color (R≈G≈B) a mismatch will be more noticeable, since the near neutral gray colors is printed in a composite black while the neutral gray is printed as K-only.

Accordingly, there is a need for a system which can accommodate customer expectations of lower billing for neutral gray color page jobs without suffering image quality degradation to the extent that a customer will view the print system as having an inferior quality print job.

BRIEF SUMMARY

A method and apparatus is provided for processing a color print job comprising detecting a pixel in a job as K-only during job workflow. The RIPped K-only pixel is then converted to a contone composite black (four color per pixel for the CMYK channels), rendered by halftoning or error diffusion, and finally printed out with composite black. The page is billed to a customer based on counting the actual number of real color pixels and not counting the color pixels that were converted from K-only pixels. The converting comprises pixel-based conversion from K-only to contone composite black based on, bit-depth of RIPped bitmap, color mode and resolution of job.

DETAILED DESCRIPTION

The subject embodiments relate to a method and apparatus for adjusting the processing of a print job having neutral gray color pixels to be printed with composite black for enhancing image quality, while detecting the pixel as monochrome for billing purposes. The conversion table that performs the K to CMYK conversion is adjusted such that there is a smooth tonal transition between the near neutral and neutral values. Accordingly, the system relates to a compromise or customer desires to maintain the lower billing rate for pages that the customer may perceive as a completely or mostly monochrome page to be billed as a black-and-white page, while it is actually printed as a four color plane (CMYK channels) color page to give the customer the benefit of enhanced image quality. Such a processing adjustment is particularly advantageous in jobs that contain sweeps of neutral gray color (R=G=B) to near neutral gray color (R≈G≈B), since a near neutral gray color is normally printed in composite black while a strictly neutral gray is printed as K-only. K-only print jobs can readily be distinguished from near neutral gray in variations in graininess, tone and hue.

Accordingly, the subject method and apparatus provides improved tone in black printing in digital print engines.

Figure 1:
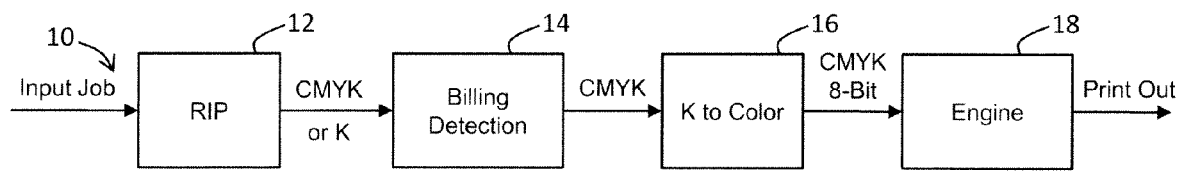
FIG. 1 is schematic block diagram/flow chart of the subject embodiments job workflow.

More particularly, with reference to FIG. 1, the subject embodiments comprise an input job workflow which is common in multi-function products and printers to raster image process (RIP) a color print job in CMYK channels where a pixel can have CMYK values or black only, if the pixel is a neutral gray color. RIP 12 is a well-known, common initial step in print job processing with "print as K-only" feature enabled. After the job has been RIPped as CMYK or K, normal workflow for billing detection involves detecting if each page is a color page (i.e. CMYK channels), or a black-and-white page (K-only channel) per page base. If a page is color, the individual pixels are inspected to determine the total number of color pixels to charge the customer according to its color content.

As noted above, conventional printers will charge different rates depending upon whether the printed page is black-and-white or color with black-and-white pages being charged less. Often times customers will mistakenly view a neutral gray color page of RGB color with R=G=B which looks like a monochrome page on the display screen as a gray page which should be billed as a K-only page. In addition, if the page consists of the four CMYK channels, the pixels on the page will be examined and only color pixels counted for color billing. Billing detection 14 will distinguish between a K-only pixel and a color pixel so that a customer will be billed for the lower rate based on the number of pixels that are not K-only and a neutral gray color.

To enhance image quality, the subject embodiment includes a K-to-color conversion step 16 after the billing detection step 14 during current job workflow. Conversion step 16 performs pixel-based conversion for a RIPped bitmap from non-8 bit data to 8-bit (contone) first, then pixel-based conversion from contone K-only to contone composite black through K-only to composite black table based on color mode and resolution of job. By adjusting the K-only to composite black table, tone and hue of composite black rendered from pure K neutral and is seamlessly matched to a near neutral gray color. Engine 18 will support the required halftoning and/or error diffusion for printing. Accordingly, the workflow program of FIG. 1 provides correctable consumer perceived billing, without introducing image quality degradation.

Figure 2:
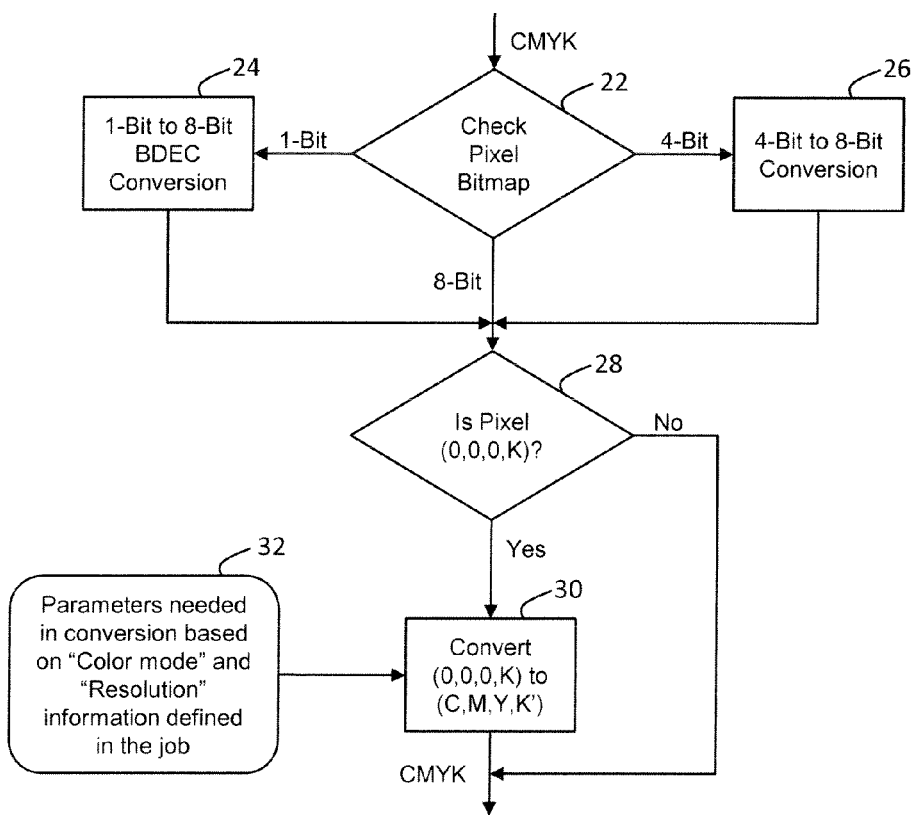
FIG. 2 is a detailed flow diagram of the K to color conversion step of FIG. 1.

With particular reference to FIG. 2, the workflow for the K-to-color step 16 is more particularly shown. The input pixel bitmap form the RIP processing is checked to determine whether it is a 1-bit binary data extended to contone 24 or a 4-bit contone 26 because it is desired that the conversion step comprise an 8-bit signal (contone). After converting or confirming that the signal is 8 bits, the pixel is checked to see if it is K-only (0,0,0,K). If so, then the (0, 0, 0, K) is converted to a composite black (C,M,Y,K') based upon the conversion process disclosed in the U.S. application Publication No. US 2009-0009778 A1, disclosure of which is incorporated herein by reference in its entirety, and the parameters 32 required for such conversion are detailed therein.

The present embodiments comprise a unique method for converting monochromatic black printing to composite black during an image path job workflow.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The word "printer" as used herein encompasses any apparatus such as a digital copier, bookmaking machine, facsimile machine, multi-function machine, etc. which performs a print outputting function for any purpose.

The claims can encompass embodiments in hardware, software or a combination thereof.

What is claimed is:

1. A method of detecting color print jobs of neutral gray color for converting a RIPped bitmap of black only to composite black during job workflow before printing comprising:
    raster image processing of an input job where a pixel is color inspected;
    detecting the pixel as black channel only or four color of CMYK channels;
    billing the one plane per pixel of black channel as a K-only page;
    converting the one plane per pixel of black channel to form planes per pixel of CMYK neutral gray; and,
    printing the input job as the converted four planes per page of CMYK neutral gray, the printing providing an image quality corresponding to color print job at a price of a monochrome print job.

2. The method of claim 1 wherein the raster image processing processes an equal RGB input job as the one plane per page of black channel only.

3. The method of claim 2 wherein the equal RGB input job is detected as the K-only page.

4. The method of claim 1 where individual pixels of all the pages in a job are detected to be K-only or color.

* * * * *